Figure 1:
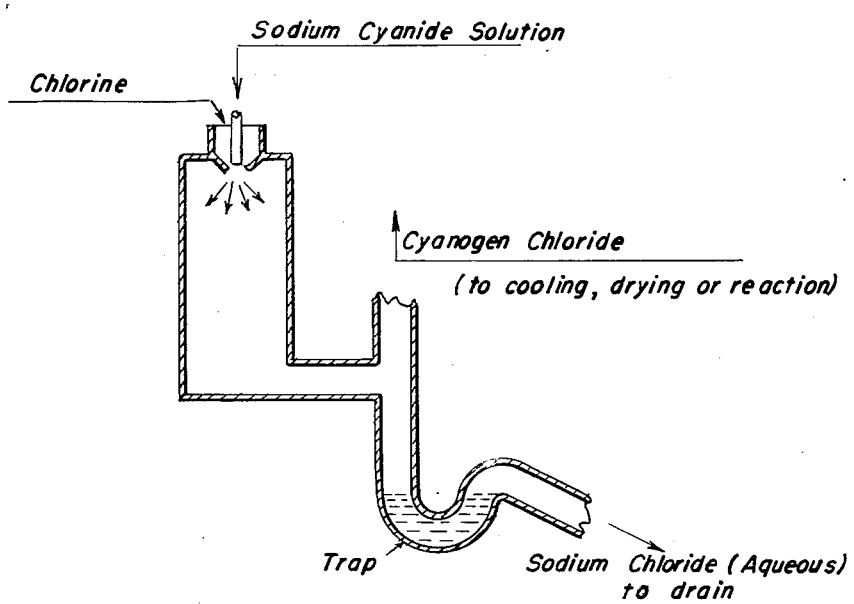

INVENTOR
HAROLD H. MORSE
WILLIAM A. MOHUN

BY
ATTORNEY

United States Patent Office 3,011,864
Patented Dec. 5, 1961

3,011,864
PROCESS FOR PRODUCING CYANOGEN
CHLORIDE
Harold H. Morse, Cincinnati, Ohio, and William A. Mohun, Lewiston, N.Y., assignors to Nilok Chemicals, Inc., Niagara Falls, N.Y., a corporation of New York
Filed Apr. 24, 1959, Ser. No. 808,842
11 Claims. (Cl. 23—14)

The present invention relates to a new and improved, simple, economical, and highly efficient process or method for the continuous production of pure cyanogen chloride wherein the common hazards encountered, the equipment necessary, and the quantity of materials in the process are all kept to a remarkable minimum.

In the main, there are two commercial processes in use at the present time for the manufacture of cyanogen chloride. The first of these known processes involves the reaction between an alkali metal cyanide, such as sodium cyanide, and elemental chlorine. The second known process is based on the reaction between hydrogen cyanide and elemental chlorine. Each process, as practiced today, has known inherent and serious disadvantages.

In the prior processes employing sodium cyanide, as exemplified by the disclosure in U.S. patents to Schmittnagel No. 1,779,984 and Dieterle No. 1,938,324, it was necessary to employ organic solvents or dispersing media, and in some cases catalysts were required as well. Now it is obvious that the introduction of such a supplementary medium complicates the process in several ways. First, hazards are created if the medium is toxic or flammable. Secondly, material cost is increased and this includes initial investment in material plus cost of make-up. Thirdly, there is an additional cost of equipment, including investment and operating cost of storage, handling, and removal and recovery equipment. Fourthly, the introduction of additional media makes for possible contamination in the final product. Other disadvantages in known processes employing sodium cyanide include refrigeration requirements, later distillation steps to remove the product, low yields due to hydrolysis of cyanogen chloride and/or complicating side reactions and secondary reactions due to length of residence time of cyanogen chloride in solution with reactants or products, and all the inherent inferior characteristics of batch processes.

Heuser in U.S. Patent No. 1,588,731 discloses the possible use of aqueous solutions of some metallic cyanides but when these aqueous solutions are employed the patentee indicates that they should be either neutral or acid. Under these conditions, they become solutions of undissociated hydrogen cyanide rather than solutions of metallic cyanide.

In prior processes employing hydrogen cyanide, as exemplified in the disclosures of U.S. patents to Heuser No. 1,588,731, Thurston No. 2,391,490 and Huemer No. 2,672,398 there are also several inherent disadvantages. Firstly, there is always the toxicity and flammability of hydrogen cyanide to be considered. Secondly, there is the difficulty of separation of hydrogen cyanide from the final products. Thirdly, hydrochloric acid is formed during the reaction and this hydrochloric acid is a promoter of hydrolysis and polymerization of cyanogen chloride in addition to being an impurity. Obviously, therefore, it thus becomes necessary to employ additional equipment or technique to minimize these disadvantages.

There are, in addition, specific disadvantages peculiar to each of the foregoing processes. In the Heuser process for example, temperature regulation and initial adjustment is required and Thurston concedes that his product is impure. In the Heumer process, in addition to inherent systematic disadvantages, there is required additional capacity, energy, and materials to maintain the novel "ten to thirty times as large" amount of liquid in recycle.

The prime object of the present invention, therefore, is to obviate, avoid and eliminate the foregoing and other disadvantages of prior art processes for the production of cyanogen chloride.

Another object is to provide a process for producing cyanogen chloride enabling the use of conveniently handled aqueous solutions of commercially available cyanides requiring no pH treatment or introduction of impurities requiring removal steps.

A further object is to provide a process of this character in which only required reactants are employed and wherein the use of objectionable solvents and/or dispersing media is obviated.

A still further object is to take advantage of the economy of using hydrogen cyanide as a raw material while avoiding most of the disadvantages of hydrogen cyanide inherent in processes previously known to the art.

Another object is to provide a process for producing cyanogen chloride wherein no multiplicity of steps, no cooling or refrigerating equipment, no special technique requiring adjustments, no series of reactors or towers and no recycle equipment or material is required.

A further object is to provide a process of the character described requiring low capital investment in equipment and wherein small product requirements are met economically.

A still further object is to provide a process for producing cyanogen chloride giving rise to a continuous and high rate of production from a minimum of reactants while employing remarkably simple equipment.

A further object is to produce cyanogen chloride by a process wherein there are no hydrolytic or polymerization promoters in contact with the final product and wherein side reactions and secondary reactions are almost completely eliminated by disengaging the final product almost instantaneously from the reaction solution, thus producing almost quantitative yields of pure cyanogen chloride.

The foregoing and other objects are achieved according to the present invention, by the intimate mixing of only the essential raw materials, elemental chlorine and alkali metal cyanide, employing suitable means providing for instantaneous disengagement of cyanogen chloride from the reaction mixture as rapidly as it is formed. As an integral part of the process, the alkali metal cyanide may be formed by using hydrogen cyanide and caustic alkali as raw materials, together with the chlorine. Briefly stated, the novel process of the invention is carried out, in its simplest form, as follows:

In the simplest preferred form of the invention, aqueous alkali cyanide solution, such as 15% sodium cyanide solution, is atomized in a mixing nozzle with chlorine gas. The reaction, forming cyanogen chloride and by-product sodium chloride, takes place essentially instantaneously. The heat of reaction raises the liquid to 80–95° C. so that the cyanogen chloride is flashed off almost instantaneously giving little opportunity for the potentially fast and numerous secondary reactions and side reactions in solution, and thereby achieving a high yield. The major by-product, sodium chloride, remains in solution and leaves the containing vessel through a simple trap. The cyanogen chloride gas stream may be dried by condensation followed by a desiccant. Feed ratio of chlorine and cyanide is essentially stoichiometric; by having a very slight excess of chlorine a liquid effluent containing essentially no cyanide is obtained and oxidation side reactions consume the excess chlorine so that there is essentially no chlorine in the cyanogen chloride gas stream and dechlorination of the product is normally not necessary. This is a practical method of operation giving in commercial operation yields of dry cyanogen chloride well over 90% of theoretical.

If one is prepared to tolerate the toxicity and flammability hazards of hydrogen cyanide, one may take advantage of its substantially lower price as compared to alkali metal cyanides by using a three component nozzle into which chlorine, hydrogen cyanide and caustic alkali solution are introduced separately, thereby forming a cyanogen chloride product gas phase and a sodium chloride waste liquid phase in essentially the same manner and with the same advantages as when using alkali metal cyanide as the raw material in a two component nozzle.

Figure 2:
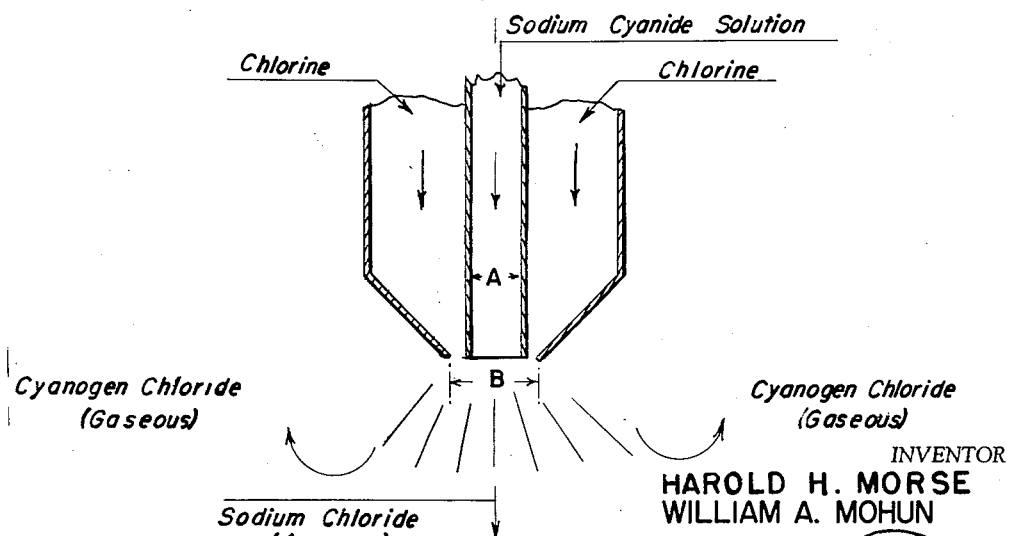
Figure 3:
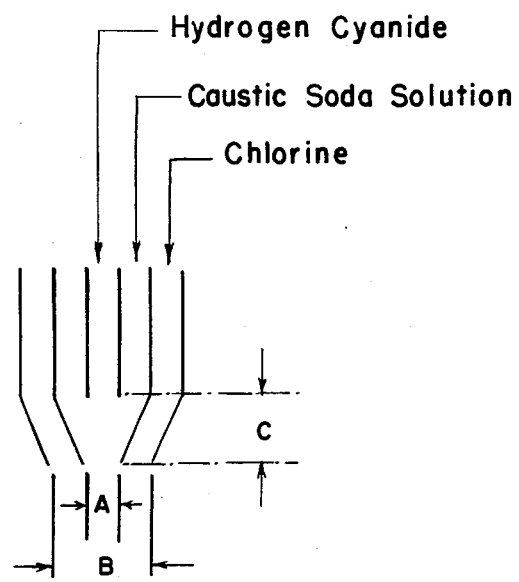

In order to describe the present invention more fully and more specifically the following examples are given, it being understood that the invention is in no way limited to these specific illustrations. During the course of the following examples reference will be made to the accompanying drawings in which:

FIGURE 1 is a schematic cross section of the apparatus employed for carrying out the process, FIGURE 2 is a schematic cross section, on a greatly enlarged scale, of a two component mixing nozzle effective to spray or atomize a stream of dissolved alkali metal cyanide into the path of a stream of chlorine gas, and FIGURE 3 is a schematic cross section, on a greatly enlarged scale, of a three component mixing nozzle which may replace the two component nozzle in FIGURE 1, effective to mix hydrogen cyanide and caustic alkali forming alkali metal cyanide solution and to atomize it in the presence of chlorine gas.

*Example 1*

(Laboratory scale)

Chlorine gas (at the rate of 0.130 gm. mols/min.) and a 15% aqueous solution of sodium cyanide (at the rate of 0.102 gm. mols CN/min.) were fed separately and continuously to a nozzle type mixer as per FIG. 2. The nozzle dimensions were A=1 mm., B=1½ mm. The yield rate of 6.31 g./min. of cyanogen chloride represented a 100% recovery based on sodium cyanide.

*Example 2*

(Plant scale)

Chlorine gas (at the rate of 33.3 lbs./hr.) and a 15% aqueous solution of sodium cyanide (at the rate of 16.5 lbs./hr.) were fed separately and continuously to a nozzle type mixer as per FIG. 2. The nozzle dimensions were A=0.060 inch, B=0.140 inch. The yield rate of 29.0 lbs./hr. of cyanogen chloride represented 98.4% recovery base on sodium cyanide. This was an extended run observed for a period of almost 200 hours.

*Example 3*

Liquid hydrogen cyanide at a rate of 0.121 mole per minute, sodium hydroxide solution of 0.0944 gm. per milliliter concentration at a rate of 0.118 mole per minute, and chlorine gas at a rate of 0.120 mole per minute were fed into a three component nozzle as illustrated by FIGURE 3, of which the distance C was 36 mm., in apparatus essentially as illustrated in FIG. 1. The rate of formation of cyanogen chloride was 7.10 grams per minute, which corresponds to 95.3% of theoretical based on the hydrogen cyanide, or which corresponds to 97.8% of theoretical based on the sodium hydroxide, which was the component present in smallest amount stoichiometrically. Analysis of the effluent liquor showed that it contained 0.7% of the original cyanide. The cyanogen chloride product contained no cyanide.

*Example 4*

Using a three component nozzle, as illustrated in FIG. 3, in which the distance C was 36 mm., in apparatus essentially as illustrated in FIG. 1, liquid hydrogen cyanide at a rate of 0.080 mole per minute was fed to the center tube, chlorine gas at a rate of 0.107 mole per minute was fed to the intermediate tube, and sodium hydroxide solution of 0.0856 gram per milliliter concentration at a rate of 0.107 mole per minute was fed to the outermost tube. The rate of formation of cyanogen chloride was 3.79 grams per minute, which corresponds to 67.1% of theoretical based on the hydrogen cyanide. Analysis of the effluent liquor showed that it contained 0.5% of the original cyanide. 16.3% of the original chlorine was found in the cyanogen chloride product stream.

Various concentrations of reactants were investigated. With gaseous chlorine and aqueous sodium cyanide a range of 5–20% sodium cyanide solution is most practical; the maximum efficiency was obtained at 15%.

| Concentration of Sodium Cyanide Solution, percent | Efficiency, percent |
|---|---|
| 10 | 72.0 |
| 15 | 96.7 |
| 20 | 74.0 |
| 30 | 35.0 |

Lower concentrations (than 15%) do not evolve sufficient heat to disengage all the cyanogen chloride. Higher concentrations produce sodium chloride at too great a rate to be carried off in solution. This latter results in interference with proper mixing.

Upper limits for feed rates may be spoken of only for a specific nozzle (since larger orifices permit larger production capacities, with apparently no physical size limit) and then only in terms of the strengths of materials involved. As far as the reaction is concerned, increased feed rates will improve atomization of the reactants and hence improve the yields. However, it will be the ability of the nozzle material, and/or piping thereto, to withstand the required pressures to obtain higher feed rates that will be the limiting factor.

Lower limits of feed rates similarly are determined only by specific nozzles (orifices of capillary size have been observed to work excellently). Thus lower limits are established by economics. Yields improve with atomization. Feed rates (for a given nozzle) too low to produce such atomization will produce too low a yield for commercial interest.

In general, then, any feed rate can be used which, with the nozzle in question, breaks the liquid stream into droplets and which does not involve fluid pressures in excess of the physical strength of the nozzle structure. To obtain large production rates it is possible to use a multiplicity of separate nozzles or a single spray head with a multiplicity of openings.

Maximum yields are obtained through a range of chlorine to sodium cyanide molar ratio of about 1.05 to 1.3; operation far above or below this range is possible but serves no useful economic purpose.

| Molar Ratio, $Cl_2/NaCN$ | Percent Yield ClCN (NaCN Basis) |
|---|---|
| 0.91 | 83.8 |
| 1.01 | 87.6 |
| 1.13 | 98.3 |
| 1.28 | 100.3 |
| 1.41 | 89.6 |
| 1.75 | 67.1 |

In the three component nozzle it is preferred to mix the hydrogen cyanide and the caustic alkali briefly before adding the chlorine, as is illustrated by Example 3. It will be noted that with only the briefest time for the formation of alkali metal cyanide before introducing the chlorine, almost theoretical yield is obtained. Example 4 has been inserted to show that, even when zero time is provided for formation of alkali metal cyanide before introducing the chlorine, substantial yields are obtained. Example 4 was carried out using the same nozzle as for Example 3 by interchanging the caustic and chlorine inlets. This nozzle has been designed for good atomization with gas flow in the outermost tube. By placing liquid in the outermost tube in Example 4 the atomization performance of the nozzle was greatly impaired as illustrated by the fact that sixteen percent of the chlorine escaped without reacting with the caustic alkali, despite the very great chemical affinity of these two materials. The relatively poor yield of Example 4 is, therefore, at least in part due to the poor mechanical performance of this nozzle when used in this way, but it illustrates that mixing of the caustic alkali and hydrogen cyanide is not essential before introducing the chlorine, although a brief premixing is preferred in the three component embodiment of our invention.

Although the mixing nozzle is a convenient way of atomizing the cyanide solution and of bringing the droplets of cyanide solution into contact with chlorine, while allowing the formed cyanogen chloride to disengage rapidly from the droplets, it is obvious that any suitable atomizing device may be used which will accomplish this purpose including devices in which the flow of chlorine does not contribute to the atomizing process. It is also obvious that, in the three component system, atomization may be effected by introducing hydrogen cyanide and caustic alkali solution through a nozzle in which the flow of chlorine does not contribute to the atomizing process. Any device which forms atomized alkali metal cyanide solution while bringing it into intimate contact with chlorine within a confining vessel which provides means to separate the gaseous product stream from the liquid waste stream will effectively practice the principle of our invention.

While preferred embodiments of this invention have been described, various modifications may be made therein without departing from the scope of the appended claims.

Attention is called to application Serial No. 526,368, filed August 4, 1955, now abandoned.

What is claimed is:

1. A process for producing cyanogen chloride which comprises reacting gaseous chlorine with aqueous alkali metal cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

2. A process for producing cyanogen chloride which comprises reacting gaseous chlorine with aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

3. A process for producing cyanogen chloride which comprises reacting gaseous chlorine with 5–20% aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

4. A process for producing cyanogen chloride which comprises reacting gaseous chlorine with 15% aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

5. A process for producing cyanogen chloride which comprises reacting gaseous chlorine with a substantially equimolecular quantity of aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separting the disengaged cyanogen chloride gas stream from the confined zone and from the effluent aqueous stream.

6. A process for producing cyanogen chloride which comprises reacting gaseous chlorine with a substantially equimolecular quantity of 5–20% aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

7. A process for producing cyanogen chloride which comprises reacting gaseous chlorine with a substantially equimolecular quantity of 15% aqueous sodium cyanide solution while said solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

8. A process for producing cyanogen chloride which comprises reacting gaseous chlorine with aqueous alkali metal cyanide solution which has been formed in situ by the reaction of hydrogen cyanide with a substantially equimolecular quantity of caustic alkali solution, said reactants being introduced in close proximity to one another in such a way that the hydrogen cyanide contacts the caustic alkali not later than the chlorine contacts the solution and in such a way that reaction with the gaseous chlorine occurs, while said aqueous alkali metal cyanide solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

9. A process for producing cyanogen chloride which comprises reacting gaseous chlorine with 5–20% aqueous sodium cyanide solution which has been formed in situ by the reaction of hydrogen cyanide with a substantially equimolecular quantity of 4–16% caustic soda solution, said reactants being introduced in close proximity to one another in such a way that the hydrogen cyanide contacts the caustic alkali not later than the chlorine contacts the solution and in such a way that reaction with the gaseous chlorine occurs while said aqueous sodium cyanide solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

10. A process for producing cyanogen chloride which comprises reacting hydrogen cyanide and gaseous chlorine with aqueous caustic alkali solution which is substantially equimolecular in quantity to the hydrogen cyanide, said reactants being introduced in close proximity to one another in such a way that the hydrogen cyanide contacts the caustic alkali not later than the chlorine contacts the solution and in such a way that reaction with the gaseous chlorine occurs while the solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

11. A process for producing cyanogen chloride which comprises reacting hydrogen cyanide and gaseous chlorine with 4–16% aqueous caustic soda solution which is substantially equimolecular in quantity to the hydrogen cyanide, said reactants being introduced in close proximity to one another in such a way that the hydrogen cyanide contacts the caustic soda not later than the chlorine contacts the solution and in such a way that reaction with the gaseous chlorine occurs while the solution is in atomized form within a confined zone and while allowing the heat of reaction spontaneously to flash off the cyanogen chloride from the atomized aqueous phase, thereby minimizing the potentially rapid and numerous side reactions and secondary reactions which would otherwise have taken place in solution, and promptly separating the disengaged cyanogen chloride gas stream from the confined zone and from the effluent aqueous stream.

References Cited in the file of this patent

UNITED STATES PATENTS

| | | |
|---|---|---|
| 1,886,487 | Lehrecke | Nov. 8, 1932 |
| 2,391,490 | Thurston et al. | Dec. 25, 1945 |
| 2,716,590 | Bretschneider | Aug. 30, 1755 |

OTHER REFERENCES

Price et al.: "Journal of the Society of Chemical Industry," vol. 39, pages 98T–101T (1920).